United States Patent Office 3,116,752
Patented Jan. 7, 1964

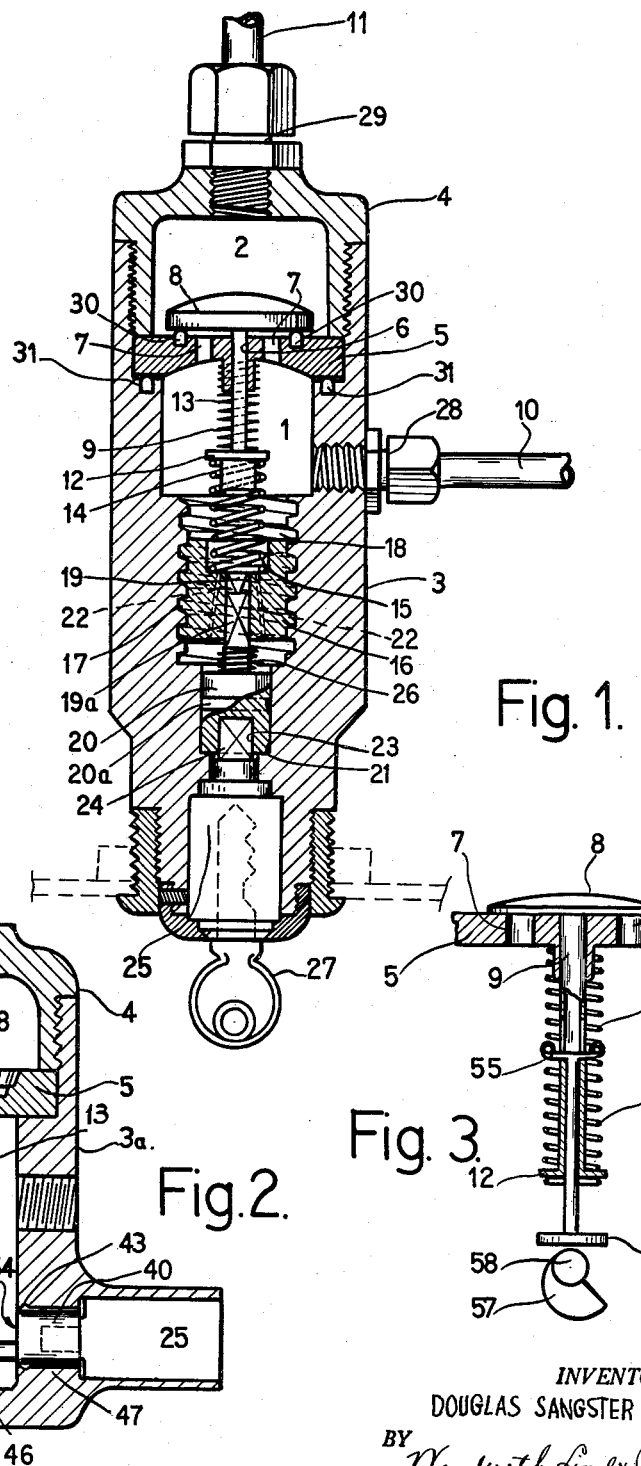

3,116,752
LOCKING DEVICE ON HYDRAULIC BRAKES TO PREVENT THEFT OF AUTOMOBILES
Douglas Sangster Duncan, 32 Audrey St., Chrisville, Johannesburg, Republic of South Africa; Martha Maria Duncan, executrix of said Douglas Sangster Duncan, deceased
Filed Oct. 19, 1960, Ser. No. 63,545
Claims priority, application Republic of South Africa Oct. 20, 1959
5 Claims. (Cl. 137—384.6)

This invention relates to improvements in locking means or devices associated with road vehicles with the object of preventing the latter from being stolen. More particularly, the invention relates to means or devices for locking the hydraulic brakes of road vehicles in the braking position to prevent theft of the vehicles.

It is known to provide a key-operated lock which, on turning of the key, causes means to displace a valve, which is arranged in a brake fluid pressure conduit from the master cylinder to the brake shoe expanding wheel cylinders, to the closed and open positions, but these have been found to be unsatisfactory because the displacement of the valve takes place against the brake system when it is under pressurized conditions. As the pressure in an hydraulic brake system is invariably very high, the lock mechanism must be of robust construction, while turning of the key requires considerable effort. Requirements of a locking device for the said purpose are that it must be of a convenient and preferably small size, easy to operate by means of conventional removable keys, and also capable of installation in any motor vehicle.

According to this invention, a lockable valve device for connection in a pressure circuit of a vehicle hydraulic brake system comprises two chambers each providing means for connection to the pressure conduit of the hydraulic system, passage means connecting said chambers, a movable valve element located in one chamber and capable of closing said passage means, spring means capable of biasing said valve element to the closed position, additional spring means capable of biasing the valve to the open position, a displaceable member within one chamber and connected to means operated by a removable key for selectively locking said displaceable member in alternative positions for controlling the action of both the spring means and whereby the valve element is resiliently retained in either the open or the closed position in such a fashion that when in the open position, the normal operation of the hydraulic brake system is permitted, while when in the closed position the valve element is displaceable to permit passage of pressure fluid to the brake applying means but prevents return flow of the fluid to keep the brakes operative on release of the brake operating means.

More particularly, the tension of the additional spring means is greater than that of the other spring means, whereby the valve element is biased to the open position by such additional spring means against the action of the other spring means. The arrangement of the valve device is such that when the additional spring means is in an inactive position, said valve is retained closed but is capable of displacement by the pressure fluid on application of the hydraulic brake operating means, e.g. the brake pedal, and automatically closes to retain the brakes operative on the release of the operating means while subsequent release of the pressurized fluid and of the brakes is permitted by placing the additional spring means in the operative position by moving the displaceable member with the aid of the key-operated means, the actual opening of the valve taking place on equalizing of the pressures in both the chambers by application of the brake-operating means.

The two chambers are formed by a casing of substantially cylindrical shape having a holed partition member and on the one side of which member an axially displaceable guided disc-like valve is capable of seating. Said valve is provided with a stem extending through said partition member, while on the stem a flange is provided which in turn is engaged by a compression spring which also bears against the partition member and is also engaged by an additional spring means comprising a compression or a tension spring which bears on or is attached to the displaceable member, which in turn is moved by a removable key-operated lock device.

The displaceable member, in one form of construction, conveniently consists of a rotatable part having a rapid screw thread engaging a complementary screw-threaded axial extension of the compartment connected to the master cylinder of the brake system, so that on its being rotated by a rotary part of a key-operated lock, said displaceable member is moved towards or away from the flanged end of the valve stem. In an alternative form of construction, the displaceable member comprises a rotatable part having a crank, cam or eccentric region for engaging or connection to one of the springs associated with the valve stem. Suitable sealing means are provided to prevent escape of fluid through the key-operated lock means.

In order that the present invention may be clearly understood, reference is now made to the accompanying sheet of drawings.

In the drawings:

FIGURE 1 is a sectional elevation of one embodiment of the device according to this invention;

FIGURE 2 is a similar view showing a preferred embodiment of the device according to this invention; and FIGURE 3 is a fragmentary sectional view showing a modified arrangement of the device according to the invention.

Referring to the drawings, reference numerals 1 and 2 denote the chambers formed by coacting casing parts 3 and 4 and partition member 5. The dividing member 5 is adapted to be securely held in position by the coacting casing parts 3 and 4. Such dividing member 5 is provided with a central hole 6 and a plurality of passage forming holes 7. The valve, located in chamber 2, comprises a disc-like element 8 having a concentric stem 9 which slidingly engages the central hole 6 of the dividing member 5 and is adapted to close off the passage holes 7.

The chamber 1 is connected by a conduit 10 to the master cylinder of the hydraulic brake system (not shown), while the chamber 2 is connected by conduit 11 to the brake shoe expansion cylinders of the wheels, which are also not shown.

On the free end of the valve stem 9 a fixed flange 12 is provided which is engaged on the valve side by a compression spring 13 and on the opposite side by a heavier compression spring 14. Said spring 13 bears against the dividing member 5 to thereby bias the valve 8 to its closed position.

The compression spring 14 has its opposite end engaged in a recess 15 or displaceable member 16. The displaceable member 16 is of substantially cylindrical shape and is provided in the circumferential surface with rapid or wide pitched acme or square screw threads 17. Said screw-threaded member 16 engages a complementary screw-threaded axial extension 18 of the chamber 1, so that on its being rotated such member is moved towards or away from chamber 1, depending on the direction of its rotation. Said member further has a non-circular axial hole 19 which is slidingly engaged by a complementary or similarly shaped cross-sectioned pin 19a which extends from a rotatable sealing element 20. The sealing element 20 is preferably rotatably located in an extension 21 extending from the screw-threaded extension 18 of chamber 1. The said screw-threaded member 16 is preferably provided with a plurality of weep holes 22 for equalizing the fluid pressure on both its ends.

The sealing element 20 is provided with at least one circumferential sealing ring 20a to prevent escape of the brake fluid. The lower end of the sealing member 20 is provided wtih a non-circular recess 23 which is engaged by a similar shaped axial projection of the rotatable part 24 of a lock 25, which is preferably of the rotatable pin tumbler or wafer type and which is retained in one end of the casing part 3.

A compression spring 26 is preferably located between the screw threaded member 16 and the sealing element 20 to facilitate inward movement of the member 16 and to prevent axial movement of the sealing member 20.

The casing parts 3 may be secured to any suitable part of the vehicle in a number of ways and at various convenient positions, preferably at a concealed position, with the lock 25 arranged at such a position that it may readily be engaged by the removable key 27.

The connectors 28 and 29, whereby the conduits 10 and 11 are coupled to the casing parts 3 and 4, are preferably not identical in order to make the connection of the conduits 10 and 11 by a union or elbow piece difficult. Because of this arrangement a thief will not be able to disconnect the device according to the invention and connect up conduits 10 and 11 in a very short time. For instance connectors 28 and 29 may have different kinds of standard screw threads, e.g. metric S.A.E., B.S.F., or other threads, or such connectors may be of different kinds.

On the seating surface of the dividing member 5 a sealing ring 30 of resilient material is provided on which the valve 8 presses in sealing engagement when in its operative position. In a similar fashion a sealing ring 31 is provided on a shoulder formed within the casing part 3 and on which the dividing member 5 bears.

In operation, the key 27 is turned in one direction to cause retraction of the displaceable member 16 when the vehicle is left unattended. The key 27 is of course also removed. In this position, the spring 14 is inactive and spring 13 causes the valve 8 to be in its seating position on the sealing ring 30. When the brake pedal is now operated, the brakes are applied due to the pressure on the fluid in the system being able to pass from chamber 1 into chamber 2. On release of the brake pedal, the system remains in the active position due to the fact that the valve 8 has now closed. Even if the brake pedal is applied instantaneously, the valve 8 will move to its closed position due to the action of spring 13 when the pressures in chambers 1 and 2 are equal. Consequently the brakes remain applied, and the vehicle cannot be driven off, or can be driven off only under great strain.

In order to release the brakes, key 27 must be inserted into the lock 25 and turned, thus causing the displaceable member 16 to be moved inwardly for compressing spring 14 against flange 12; the brake pedal must then be applied to equalize the pressures in chambers 1 and 2, and on equalization valve 8 lifts off its seat 30. The said spring 14, overcoming the compression of spring 13, will retain the valve 8 in the inoperative position, permitting normal driving and application of the brakes. With the device according to this invention, the locking of the brakes and the unlocking of the brakes requires depression of the brake pedal or such like means.

In order to prevent the displacement of the member 16, on removal of the lock, with the aid of a screwdriver or like means inserted through the lock cavity, the pin 24 of the lock 25 may be arranged to extend through the sealing member and into the axial non-circular hole 19 of the member 16, so that on removal of the lock and lifting of the valve by rotating the member 16, the brake fluid will escape and consequently the braking system of the vehicle will be inoperative and ineffective. With this latter arrangement, sealing means must be incorporated internally of the sealing member 20 for engaging the extension 24 of the lock 25. Said extension 25, in respect of a part located within the sealing member 20, may be of cylindrical shape for easier sealing. Alternatively, the member 20 may be dispensed with while the means for sealing is located on the casing part 3.

With the arrangement as shown in the drawings the brakes will remain locked when the lock 25 has been removed.

Hydraulic vehicle brakes are not intended to be retained in the braking or pressurised position over a long period, and in order not to damage any of the parts of such system, a very slight leakage in the valve system may be provided to cause the pressure to drop over a substantial period, so that after such period the brakes will be inoperative; but immediately the brake pedal or the like is again applied, the brakes become locked once again for such a period.

In a preferred application of the invention, the lock end of the device is preferably directed downwardly, while the under face of the dividing member 5 and also the interior transverse face of the casing part 4 are of dome shape in order to permit ready escape of air bubbles when bleeding the hydraulic brake system.

In the preferred form of the invention, the lifting of valve 8 incorporates the means as shown in FIGURE 2. In this arrangement, the barrel of the lock 25 has, as compared with the embodiment of FIGURE 1, a non-circular extension for engaging a complementarily-shaped recess in a cylindrical element 40, which in turn is rigidly connected to a second cylindrical element 41 by an eccentrically-disposed crank or cam-forming connector bar 42. The cylindrical elements 40 and 41 are rotatably mounted in in-line journal-forming holes provided transversely in the casing part 3a. The spring 14 is located within a housing 45 which is axially movable relative to the flange 12 of the valve stem 9 and serves to keep the spring 14 in position and in addition provides a face 46 for bearing on the crank-like connector bar 42. The engagement of the said face 46 on the connector bar 43 is substantially in a tappet fashion. The arrangement is such that for moving of the valve 8 to the open position or for permitting the valve to move to its closed alternative position through the action of spring 13, the lock barrel is rotated by its key, whereby the rotor, consisting of the cylindrical elements 40 and 41 and the connector bar 42, is rotated.

With this arrangement, the lock barrel is positioned at right angles to the axis of the device. With the cylindrical elements 40 and 41, sealing rings 43 and 44 are provided to prevent leakage of the brake fluid, particularly when the brake fluid is under pressure.

To prevent the lifting of the valve 8 on removal of the lock 25 by using a tool such as a screw-driver or the like to rotate the rotor, the cylindrical element 41 is given to a larger diameter than the cylindrical element 40. The cylindrical element 40 is rotatably located in a hole 47 of the casing 3a while the cylindrical element 41 is rotatably located in the recess of a recessed plug 49 which is screwed into a screw threaded hole 50 of casing 3a. The spanner engaging end 51 of the recess plug 49, after being used for tightly screwing such plug into the screw threaded hole, is cut off to prevent removal of the plug with the aid of ordinary tools. Within the recess 48 of the plug 49, a compression spring 52 is provided for bearing on the outwardly-directed face of the cylindrical element 41 and for pushing the cylindrical element 40 against the lock 25. The fixing means of the lock 25 prevents axial displacement of the rotor comprising said cylindrical elements 40 and 41 and the connector bar 42. On removal of the lock 25, the spring 52 will cause axial displacement of the rotor, and by positioning the sealing ring 43 in the hole 47 close to the chamber forming space 1, only a small movement of the rotor is necessary to permit leakage of brake fluid past the cylindrical element 40. The cylindrical element 41 is of larger diameter than cylindrical element 40 in order to present a face 53 which is larger than face 54. By this provision, the insertion of the rotor in its operative position is facilitated, but more particularly it provides a means for preventing the rotor being forced out together with the lock 25 when pressure is applied to the fluid in chamber 1 on application of the brake applying means. Due to the larger surface 53, the rotor is in fact biased away from the lock 25. Should, however, the lock 25 be removed, the compression spring 52 will cause the cylindrical element 40 to be moved past the sealing ring 43, so that when the fluid in chamber 1 is placed under pressure, the fluid will escape or be blown out of the device through the lock receiving cavity of the casing 3a.

It should be understood that while certain preferred structural forms and certain preferred types of the invention have been set forth, the invention is not limited thereto and various other physical embodiments, dimensions and characteristics will be suggested by the above.

The two springs 13 and 14 may be formed by a single compression spring (see FIGURE 3) which bears against member 5 at one end and is connected to the flange 12 of the valve stem 9 at the opposite end. The spring is engaged intermediately of its ends by a transverse yoke 55 which is slidably associated with the valve stem 9 and has a transverse tappet-like part 56. Part 56 is engaged by cam 57 of a shaft 58. Shaft 58 is a concentric part of a rotor which is rotated by a rotatable part of a key-operated lock 25. The part 13 of the spring, bearing on the yoke 55, provides the biasing means to retain the valve 8 in the closed position, but when the yoke 55 is lifted by cam 57 engaging on the transverse tappet-like part 56, such spring part 13 does not act on the valve, whereas the spring part 14 then acts as a tension spring which, by virtue of its connection to flange 12, lifts the valve or biases the valve to the raised position. In the closed position of the valve, the whole spring may act on the flange 12. In this case, greater movement of the yoke 55 will be required before the valve lifts or is strongly biased to its open position. Alternatively, the yoke 55, in its lowest position, may engage abutments provided on the valve stem so that only the part 13 of the spring will act on the valve.

The valve 8 can also be manufactured from resilient material, whereby the seal 30 becomes unnecessary. In place of the seal 31, gasket compounds, faced joints or other gaskets of suitable material may be employed.

The valve 8 need not necessarily be of the mushroom type, as is shown in FIGURE 1, but may be of the mitre type, as is shown in FIGURE 2. Such mitre type valve may be of a kind having metal-to-metal faces; but if desired, resilient composition face means may be provided. Furthermore, the valve 8 may be of a ball type.

The valve device according to this invention can be readily associated with the ignition control switch of a motor vehicle, so that with the ignition switch in the "off" position the brakes are locked or capable of being locked on operation of the brake pedal or the equivalent. The ignition lock can be adapted, in addition, to operate the starter motor according to known practice.

I claim:

1. A valve device for locking fluid under pressure in an hydraulic line, said device comprising a housing having two chambers therein each of which has connection means adapted to connect said chambers into the fluid line, said housing having passage means connecting said chambers, a movable valve element for closing said passage means and located in one chamber which is adapted to communicate with that part of the fluid line in which the fluid is to be locked under pressure, a first spring means acting on said valve element to bias said valve element into the closed position, a second spring means acting on said valve element to bias the valve element to the open position against the action of the first spring means, a displaceable member capable of movement from one alternative position to another alternative position within the chamber adapted to communicate with that part of the pipeline extending from a source producing fluid under pressure, said member acting on said second spring means and in one of the alternative positions placing the second spring means in commission to overcome the action of first spring means and to bias the valve element towards the open position when said valve element is held closed by the fluid locked under pressure and also to transfer and hold said valve element in the open position after equalizing of fluid pressure in both chambers to permit passage of fluid in opposite directions, and in the other alternative position of said member the said second spring means is ineffective and the first spring means acts on the valve element to hold such element in the closed position permitting the passage of fluid in one direction, a lock operable by a removable key and having a movable part coupled to the displaceable member to transfer said displaceable member to the alternative positions, and sealing means between said lock and said chamber having said member therein to prevent escape of fluid under pressure past the lock.

2. A valve device for locking fluid under pressure in an hydraulic line, said device comprising a housing having two chambers therein each of which is provided with connection means for connection of the housing across a fluid line, said housing having passage means connecting said chambers, a movable valve element located in one chamber which is adapted to communicate with that part of the fluid line in which the fluid is to be locked under pressure, a stem on said valve element which extends into the other chamber through the portion of said housing between the chambers for guiding the valve element, said stem having a flange on the end region thereof located in said other chamber, a first compression spring engaging said flange and biasing the valve element to the closed position, a second compression spring of greater strength than said first spring, a displaceable member operatively located within said other chamber which is adapted to be connected to a source for producing fluid under pressure in the fluid line, a key operated lock having a rotatable part to which said displaceable member is connected for displacement of said member to alternative positions, whereby fluid under pressure may pass through the valve device in opposite directions when the valve element is held in the open position by the second compression spring and when the displaceable member is in one alternative position while, when the said displaceable member is in the other alternative position the said second compression spring is ineffective and the valve is retained in the closed position by the first compression spring to permit passage of fluid under pressure in one direction and for locking of fluid under pressure in a part of the fluid line while opening of such valve is effected by placing the displaceable member in the first alternative position for the second compression spring to apply an opening pressure on the valve element whereas actual opening of the valve element takes place on equalizing the pressure in both chambers.

3. A valve device as claimed in claim 2, wherein the displaceable member comprises a part having a rapid screw thread, and said other chamber has a complementary screw thread, said displaceable member being rotated by the rotatable part connected to the member and which rotatable part is rotated by the removable key.

4. A valve device as claimed in claim 2, wherein the displaceable member comprises a rotatably disposed part located transversely to the direction of displacement of the valve element and consisting of two spaced coaxial cylindrical elements, said housing having aligned holes therein in which said cylindrical parts are rotatably and sealingly mounted, a cam forming portion connecting said cylindrical parts and engaging the second spring of the valve element, means extending from the rotatable part of the key operated lock and engaging one of said cylindrical elements for turning it.

5. A valve device as claimed in claim 4, wherein the cylindrical elements of the valve controlling displaceable member are of different diameters and in which the smaller element is coupled to the rotatable part of a key operated lock, sealing means around said smaller element, and further spring means biasing the larger element in the direction of said lock, whereby on removal of the lock the spring pressure forces the smaller displaceable member axially in the direction of lock containing hole of the housing and past the sealing means coactingly associated with the smaller cylindrical element to permit escape of the fluid, and whereby with the lock in position and on application of fluid under pressure said displaceable member is forced in a direction away from the lock by pressure acting on the larger face area of the larger cylindrical element presented to the fluid under pressure within the valve housing.

References Cited in the file of this patent
UNITED STATES PATENTS

| | | |
|---|---|---|
| 2,080,603 | Cometto et al. | May 18, 1937 |
| 2,220,620 | Capen | Nov. 5, 1940 |
| 2,541,282 | Powers | Feb. 13, 1951 |
| 2,572,190 | Patrick | Oct. 23, 1951 |
| 2,638,194 | Gray | May 12, 1953 |
| 2,803,425 | Little | Aug. 20, 1957 |
| 2,845,943 | Perkins | Aug. 5, 1958 |
| 2,886,060 | Highland et al. | May 12, 1959 |
| 2,964,141 | Schlumbrecht | Dec. 13, 1960 |

FOREIGN PATENTS

| | | |
|---|---|---|
| 745,875 | Great Britain | Mar. 7, 1956 |